(12) United States Patent
Abney et al.

(10) Patent No.: US 7,678,744 B2
(45) Date of Patent: *Mar. 16, 2010

(54) HYDROCARBON INDUSTRY SERVICING FLUID AND METHODS OF PERFORMING SERVICE OPERATIONS

(75) Inventors: Laurence J. Abney, Sandnes (NO); Graeme W. Pirie, Rio de Janeiro (BR); Tim Hunter, Duncan, OK (US); Billy Slabaugh, Duncan, OK (US); Leonard Case, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 919 days.

This patent is subject to a terminal disclaimer.

(21) Appl. No.: 11/294,815

(22) Filed: Dec. 6, 2005

(65) Prior Publication Data

US 2007/0129259 A1 Jun. 7, 2007

(51) Int. Cl.
*C09K 8/68* (2006.01)
(52) U.S. Cl. .................. 507/200; 210/501; 210/637
(58) Field of Classification Search ................ 507/200; 210/501, 637
See application file for complete search history.

(56) References Cited

U.S. PATENT DOCUMENTS

| | | | |
|---|---|---|---|
| 5,597,482 | A | 1/1997 | Melyon |
| 5,799,734 | A | 9/1998 | Norman et al. |
| 6,214,773 | B1 | 4/2001 | Harris et al. |
| 6,488,091 | B1 | 12/2002 | Weaver et al. |
| 6,640,898 | B2 | 11/2003 | Lord et al. |
| 6,683,313 | B2 | 1/2004 | Chen et al. |
| 6,796,436 | B2 * | 9/2004 | Carson et al. ............... 210/501 |
| 6,911,419 | B2 | 6/2005 | Lord et al. |
| 6,913,080 | B2 | 7/2005 | Lehman et al. |
| 6,923,264 | B2 | 8/2005 | Slabaugh et al. |
| 2003/0148527 | A1 | 8/2003 | Prasad |
| 2006/0226077 | A1 * | 10/2006 | Stark ........................ 210/637 |

FOREIGN PATENT DOCUMENTS

WO WO 2004/090284 10/2004

OTHER PUBLICATIONS

Patent application entitled "Irradiation System and Methods of Treating Fluids in Hydrocarbon Industry Applications," by Laurence J. Abney, et al., filed Dec. 6, 2005, as U.S. Appl. No. 11/295,382.
Ballast Water Treatment System, The Alfa Laval Ballast Water Treatment System, Nov. 2004 (6 pages).
Excerpts from the website of HOH Water Technology A/S, The HOH Group, http://www.hoh.com, printed Nov. 15, 2005 (31 pages).
Patent application entitled "Devices and Processes for Removal of Impurities from a Fluid Recovered from a Subterranean Environment" by Hanes, Jr., et al., filed Feb. 22, 2005, as U.S. Appl. No. 11/062,963 (not attached).
Patent application entitled "Devices and Processes for Removal of Impurities from a Fluid Recovered from a Subterranean Environment" by Hanes, Jr., et al, filed Feb. 22, 2005, as U.S. Appl. No. 11/063,307 (not attached).
XP-001116576 "Pollutant Treatment Process Cuts Water Storage Requirement" by Paul Eastaugh.
Foreign communication related to a counterpart application dated Feb. 19, 2007.
Foreign communication from a related counterpart application—Russian examination report for RU 2008127391/15 (033579), Oct. 2, 2009, 8 pages.

\* cited by examiner

*Primary Examiner*—Timothy J. Kugel
*Assistant Examiner*—Atnaf Admasu
(74) *Attorney, Agent, or Firm*—John W. Wustenberg; Conley Rose, P.C.

(57) ABSTRACT

A hydrocarbon industry servicing fluid comprises an irradiated fluid that is biologically inert. The fluid may be irradiated with ultraviolet light. A method comprises performing a hydrocarbon industry service operation with an irradiated fluid that is biologically inert. The method may comprise disposing of the irradiated fluid to the environment or capturing the irradiated fluid when the service operation is complete. The method may further comprise re-irradiating the captured irradiated fluid to produce a remediated fluid, and performing a service operation with the remediated fluid.

28 Claims, 3 Drawing Sheets

HYDROCARBON INDUSTRY SERVICING FLUID AND METHODS OF PERFORMING SERVICE OPERATIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates generally to the use of irradiation, such as ultraviolet light, to disinfect fluids, including water. More particularly, the present invention relates to hydrocarbon industry applications where irradiation may be used to disinfect fluids, instead of treating fluids with chemical biocides or using untreated fluids.

BACKGROUND

In hydrocarbon industry applications, such as offshore pipeline pre-commissioning procedures and well fracturing operations, servicing fluids including seawater and fresh water may be left untreated or may be rendered biologically inert by treating the fluids using chemical biocides.

In offshore pipeline applications, a water-based servicing fluid may be used to flood the pipeline during installation or to flood and hydrostatically test the pipeline once installed. During installation, the pipeline is laid on the seabed and then flooded with seawater, or in the case of alloy pipelines, fresh water. Once a pipeline is flooded, subsea connections can then be made. In particular, divers or remotely operated vehicles (ROVs) physically open the pipeline and connect it to a wellhead, subsea template, or riser system, for example. When making subsea connections to an alloy pipeline, it is undesirable for the seawater to contact the inner pipeline surfaces because seawater may corrode the pipeline. Therefore, the alloy pipeline is flooded with fresh water that includes a slug of gelled water at each end. As such, when the end of the pipeline is opened up for subsea connections to be made, the gel barrier prevents seawater from ingressing into the pipeline and mixing with the fresh water. After all subsea connections are made, additional water is pumped into the pipeline to hydrostatically test the structural integrity of the pipeline and any connected components. Once installation and testing are complete, the water contained within the pipeline is displaced and, in some cases, disposed of to sea.

At any point where water is being introduced into the pipeline, whether in the flooding stage or in the hydrostatic test stage, this water is typically filtered and treated with a chemical biocide to disinfect the water. The purpose of such treatment is to prevent bacteria and biological growth from causing damage to the pipeline internal surface. However, due to environmental laws and regulations, seawater used for hydrostatic testing in a number of locations, such as the Gulf of Mexico, cannot be disposed of to sea if it contains any chemical biocides. Therefore, untreated seawater is used, which permits organic growth in the pipeline, which may constrict and/or corrode the pipeline. This can have a detrimental effect on the available flow rates of the pipeline once in service. Although discharge of water containing chemical biocides is still permitted in other parts of the world, many countries are beginning to follow the lead of the Gulf of Mexico by prohibiting the discharge of chemical biocide treated water to sea because such discharge may harm marine life. Therefore, a need exists for a fluid treatment method that complies with environmental requirements and is not harmful to marine life if discharged to the ocean.

Chemical biocides are also used during pre-commissioning procedures for pipelines installed onshore. Disposal of water containing chemical biocides on land is also prohibited in some environmentally sensitive regions of the United States. In regions where no prohibitions exist, disposing of water containing chemical biocides is still undesirable in that it may harm wildlife and contaminate underground water. Therefore, a need exists for an alternative, environmentally friendly method of disinfecting fluid.

Fluids treated with chemical biocides are also used in well bore servicing operations, such as fracturing a formation, for example. These operations are often conducted in remote locations where water is scarce and must be transported to the well site, which is costly. Typically, the water is filtered and treated with chemical biocides to prevent bacterial growth during transportation and/or storage. In a fracturing application, a gelling agent and other constituents are added to the water prior to injection into the well bore. However, gel may act as a food source for any bacteria present in the fluid. Thus, if bacteria is present in the base water, the bacteria will eventually destroy the gel and negatively impact the fracturing operation. Hence, the water is generally disinfected with chemical biocides before its use in the fracturing operation.

Once the fracturing operation is complete, flowback fluid recovered from the well bore may be stored in man-made tanks or lined pits, but it is not disposed of to land due to the chemical biocides. This flowback fluid containing chemical biocides is typically not remediated for re-use or disposal because such remediation of the fluid using chemical treatments, for example, is cost prohibitive. Instead, the flowback fluid is generally removed from the well site for proper treatment and disposal. Specifically, proper disposal of fluids containing biocides requires removal of the biocide before the fluid can be returned to the environment.

Due to the scarcity of water in many remote locations, and the cost associated with transporting water to and from these well sites, it would be beneficial if formation fluid produced from the well could be used, or flowback fluid could be reused following a service operation. However, treatment of formation fluid and flowback fluid to remove bacteria is necessary for the success of many operations, such as fracturing. Hence, a need exists for a cost effective method of disinfecting produced fluid and flowback fluid for reuse in a well bore servicing operation, or for disposal to the environment.

SUMMARY OF THE INVENTION

In one aspect, the present disclosure relates to a hydrocarbon industry servicing fluid comprising an irradiated fluid that is biologically inert. The irradiated fluid may be irradiated via exposure to ultraviolet light and may comprise a volume of fresh water, seawater, formation fluid, flowback fluid, or a combination thereof. The hydrocarbon industry servicing fluid may further comprise other constituents. In various embodiments, the hydrocarbon industry servicing fluid comprises filling fluid, cleaning fluid, hydrostatic testing fluid, flooding fluid, flushing fluid, preservation fluid or fracturing fluid.

In another aspect, the present disclosure relates to a method of performing a hydrocarbon industry service operation with an irradiated fluid that is biologically inert. In an embodiment, the fluid is irradiated with ultraviolet light. In various embodiments, the hydrocarbon industry service operation comprises injecting the irradiated fluid into a well; fracturing a formation; flooding a pipeline, hydrostatically testing the pipeline, or both; or filling, cleaning, hydrostatically testing, flushing, preserving, or a combination thereof. The method may further comprise disposing of the irradiated fluid to the environment or capturing the irradiated fluid when the service operation is complete. In an embodiment, the method further comprises re-irradiating the captured irradiated fluid to produce a remediated fluid, and performing a service operation with the remediated fluid.

BRIEF DESCRIPTION OF THE DRAWINGS

For a more detailed description of the present invention, reference will now be made to the accompanying drawings, wherein.

NOTATION AND NOMENCLATURE

Figure 1:
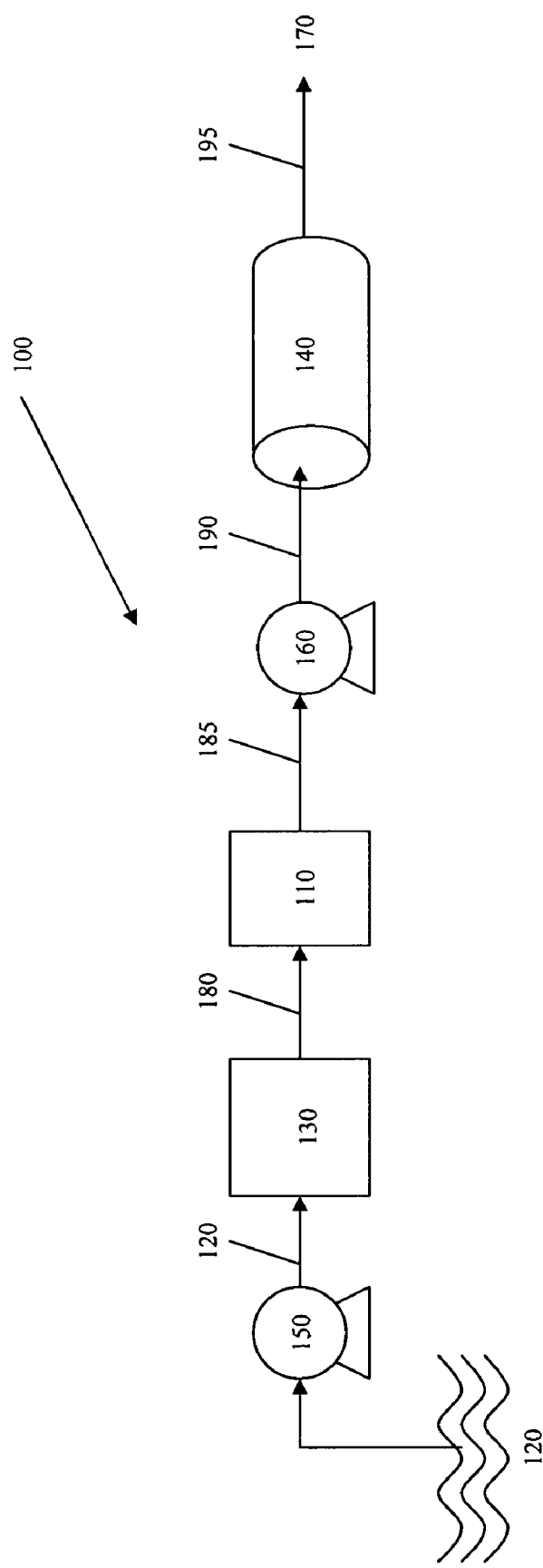
FIG. 1 is a flow schematic of a representative pipeline operation employing an irradiation system to disinfect seawater, fresh water or another fluid.

Certain terms are used throughout the following description and claims to refer to particular assembly components. This document does not intend to distinguish between components that differ in name but not function. In the following discussion and in the claims, the terms "including" and "comprising" are used in an open-ended fashion, and thus should be interpreted to mean "including, but not limited to . . . ".

As used herein, each of the terms "disinfect" and "remediate" mean to render biologically inert. Hence, to disinfect or remediate water, for example, means to render the water biologically inert by killing the micro-organisms in the water.

As used herein, the term "pipeline" includes any line in which fluid is moved, including any onshore or offshore flow system, such as mainline systems, risers, flow lines used to transport untreated fluid between a wellhead and a processing facility, and flow lines used to transport treated fluids.

In the drawings, the arrows indicate the direction of fluid flow through the system in a sequential operation.

DETAILED DESCRIPTION

Various embodiments of apparatus and methods for treating a fluid for use in hydrocarbon industry applications will now be described with reference to the accompanying drawings, wherein like reference numerals are used for like features throughout the several views. There are shown in the drawings, and herein will be described in detail, specific embodiments of irradiation systems and methods of using such systems to disinfect fluid, with the understanding that this disclosure is representative only and is not intended to limit the invention to those embodiments illustrated and described herein. The embodiments of fluid treatment methods and irradiation systems disclosed herein may be utilized in any type of hydrocarbon industry application, operation, or process where it is desired to disinfect fluid, including, but not limited to, pipeline operations; well servicing operations; upstream exploration and production applications; and downstream refining, processing, storage and transportation applications. It is to be fully recognized that the different teachings of the embodiments disclosed herein may be employed separately or in any suitable combination to produce desired results.

FIG. 1 schematically depicts a representative pipeline operation 100 utilizing an irradiation system 110, such as an ultraviolet light treatment apparatus, to render the fluid 120 biologically inert. The fluid 120 may be seawater, fresh water, or another fluid, and preferably comes from a readily available source, such as a river or the ocean. In one embodiment, the pipeline operation 100 comprises a lift pump 150, an irradiation system 110, filters 130, a pipeline fill pump 160, and a pipeline 140. The filters 130 may comprise any type of filtering apparatus to remove particles from the fluid 120, such as a sock type filter where the fluid 120 flows through a filtering insert that collects particles or any other filter as described herein. The lift pump 150 and the pipeline fill pump 160 may be any type of pump suitable for moving the fluid 120 through the irradiation system 110, filters 130 and pipeline 140. The pipeline 140 may be constructed of carbon steel, an alloy, or any other material suitable for the pipeline pre-commissioning operation 100. The pumps 150, 160, the irradiation system 110, and the filters 130 may be containerized with other flow equipment and regulation instrumentation and mounted on a skid, thereby making the entire apparatus portable. In an embodiment, the skid mounted equipment is electrically powered and may be operated using generators in remote locations.

As represented by the flow arrows, the lift pump 150 transports the fluid 120 through the filters 130, into line 180, and then into the irradiation system 110, where the filtered fluid is disinfected. The purpose of disinfection is to kill micro-organisms in the fluid 120. In an embodiment, the irradiation system 110 comprises an ultraviolet light apparatus, such as a UV-disinfection system available from HOH Water Technology A/S of Denmark, for example. The irradiation system 110 causes the deactivation of micro-organisms, thereby effectively disinfecting the fluid 120. In an embodiment, the filters 130 remove a significant quantity of debris and biological material from the fluid 120 upstream of the irradiation system 110, thereby enhancing the treatment process. In particular, the ultraviolet light source within the irradiation system 110 should penetrate through a filtered fluid more effectively than through a debris-laden fluid, and some removal of biological material upstream of the irradiation system 110 should enhance the efficiency of the irradiation treatment. In contrast to untreated fluids, such as water, irradiated fluids do not as readily corrode the wall of the pipeline 140. Further, as compared to using chemical biocides, disinfection by irradiation is more cost effective and also produces an environmentally safe fluid for disposal to the environment. After exiting the irradiation system 110, the irradiated and filtered fluid in line 185 is then transferred by the pipeline fill pump 160 through line 190 and into the pipeline 140 for use in pipeline operations, such as filling and testing procedures, for example. Once the pipeline operations are complete, the fluid exits the pipeline 140 through line 195 where the fluid may be disposed of to the environment 170 without harm thereto.

One of ordinary skill in the art will readily appreciate that the representative pipeline operation 100 of FIG. 1 may be performed offshore or onshore, and may include different components than the ones shown in FIG. 1. The pipeline operation 100 may involve pre-commissioning the pipeline 140, such as during installation and testing, or post-commissioning operations, such as a repair or replacement procedure. Although FIG. 1 shows the fluid 120 passing first through the filters 130 and then through the irradiation system 110, the relative position of these treatment devices may be reversed. For example, the fluid 120 may be first irradiated and then filtered.

In another hydrocarbon industry application, the irradiation apparatus 110 may be used to remediate produced fluid, which includes formation fluid or flowback fluid produced during well fracturing or other servicing operations. Such remediated fluid may be reused as a well bore servicing fluid, or may be disposed of to the environment. While the following discussion of FIG. 2 and FIG. 3 focuses on well fracturing, it should be understood that the present disclosure may be used to treat water for use in any well bore servicing fluid, or to treat such fluids themselves as needed to disinfect same.

Figure 2:
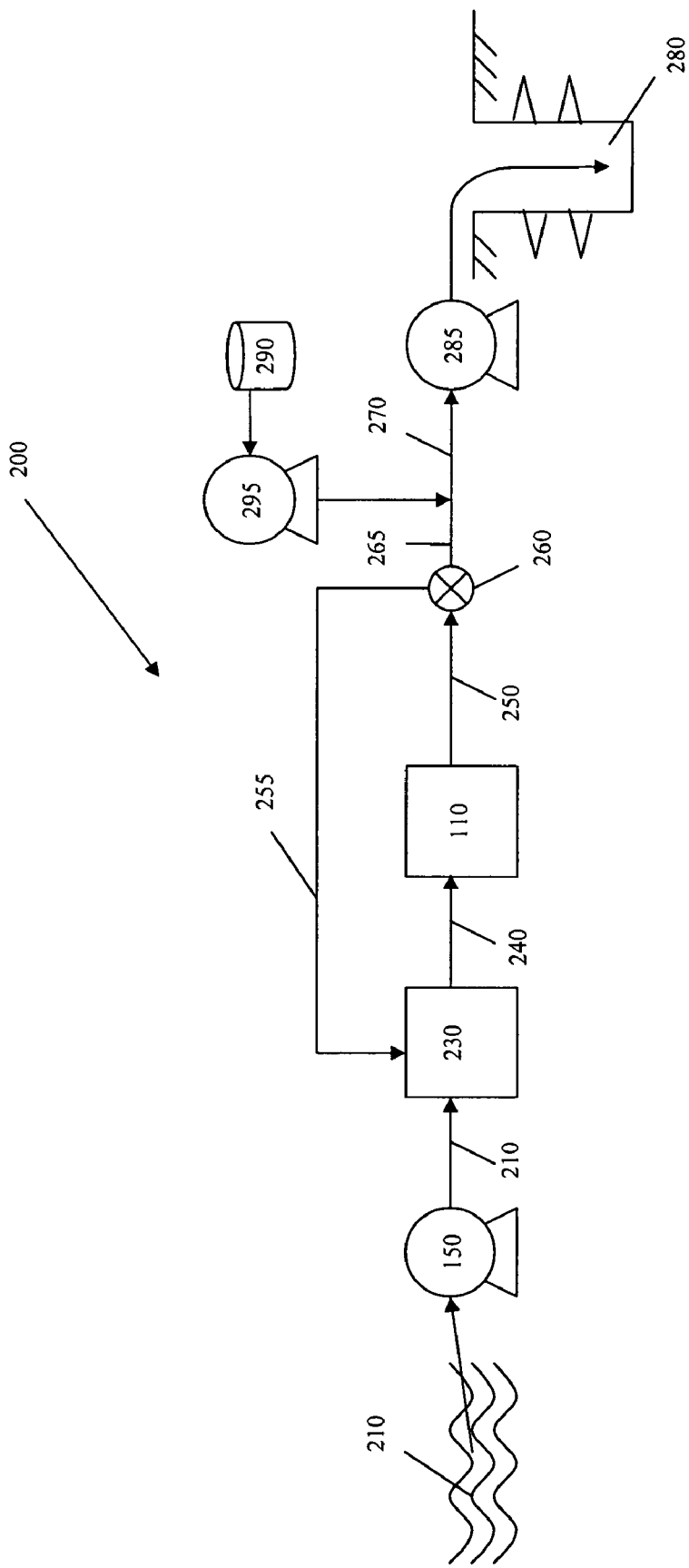
FIG. 2 is a flow schematic of a representative well servicing operation employing an irradiation system to disinfect fluid to be used in a fracturing operation.

FIG. 2 schematically depicts a representative well bore servicing operation 200 utilizing the irradiation apparatus 110 to disinfect or remediate fluid supplied from a readily available source as an alternative to using trucked-in water treated with chemical biocides. The water 210 from a readily available source may be fresh water, seawater, or formation water. Formation water includes water produced from a well on site, which may be the same or different well from that being serviced. In an embodiment, this water 210 could even comprise trucked-in water that has not been treated with chemical biocides. The well bore servicing operation 200 comprises a lift pump 150, filters 230, the irradiation apparatus 110, a valve 260, storage 290 for gel and other fracturing fluid components, an injection pump 295, a service pump 285, and a well bore 280 within which a servicing operation is being conducted, such as fracturing, for example.

The filters 230 may comprise a variety of different types of filters, depending upon the requirements of the operation, including sock type filters, boron removal filters, micron particle filters, activated charcoal filters, and/or another type of filter to make the fluid 120 suitable for a well fracturing operation. In one embodiment, the filters 230 comprise the filtering system depicted and described in U.S. patent application Ser. Nos. 11/062,963 and 11/063,307, both filed on Feb. 22, 2005, and both entitled "Devices and Processes for Removal of Impurities from a Fluid Recovered from a Subterranean Environment", assigned to Halliburton Energy Services, Inc., also the assignee of the present application. Pumps 150, 285, and 295 may be any type of pump suitable for moving the fluid 210. Valve 260 may be any type that is operable to direct fluid flow and that is compatible with the fluids in the well bore servicing operation 200. As in the pipeline operations 100 shown in FIG. 1, the pumps 150, 285, 295; the filters 230; the irradiation apparatus 110; and the valve 260 may be containerized with the connecting piping and other flow regulation equipment and instrumentation and mounted on a skid, thereby making the entire apparatus portable. In an embodiment, the skid mounted equipment is electrically powered and may be operated using generators in remote locations.

As depicted, the water 210 from a readily available source is conveyed through the filters 230 by the lift pump 150. The filtered water in line 240 then passes through the irradiation apparatus 110, where it is disinfected. The filtered and irradiated fluid in line 250 then passes through a valve 260 where it may be diverted into a re-treatment line 255 or continue on through line 265 to the fracturing operation in the well bore 280. The filtered and irradiated fluid in line 265 is injected with gel and other fracturing fluid components from storage 290 via injection pump 295, resulting in a fracturing fluid entering line 270. The service pump 285 then injects the fracturing fluid from line 270 into the well bore 280 to conduct the fracturing operation. It should be understood that other servicing fluids can be made in a like manner, and the additives injected via pump 295 may be selected accordingly.

Figure 3:
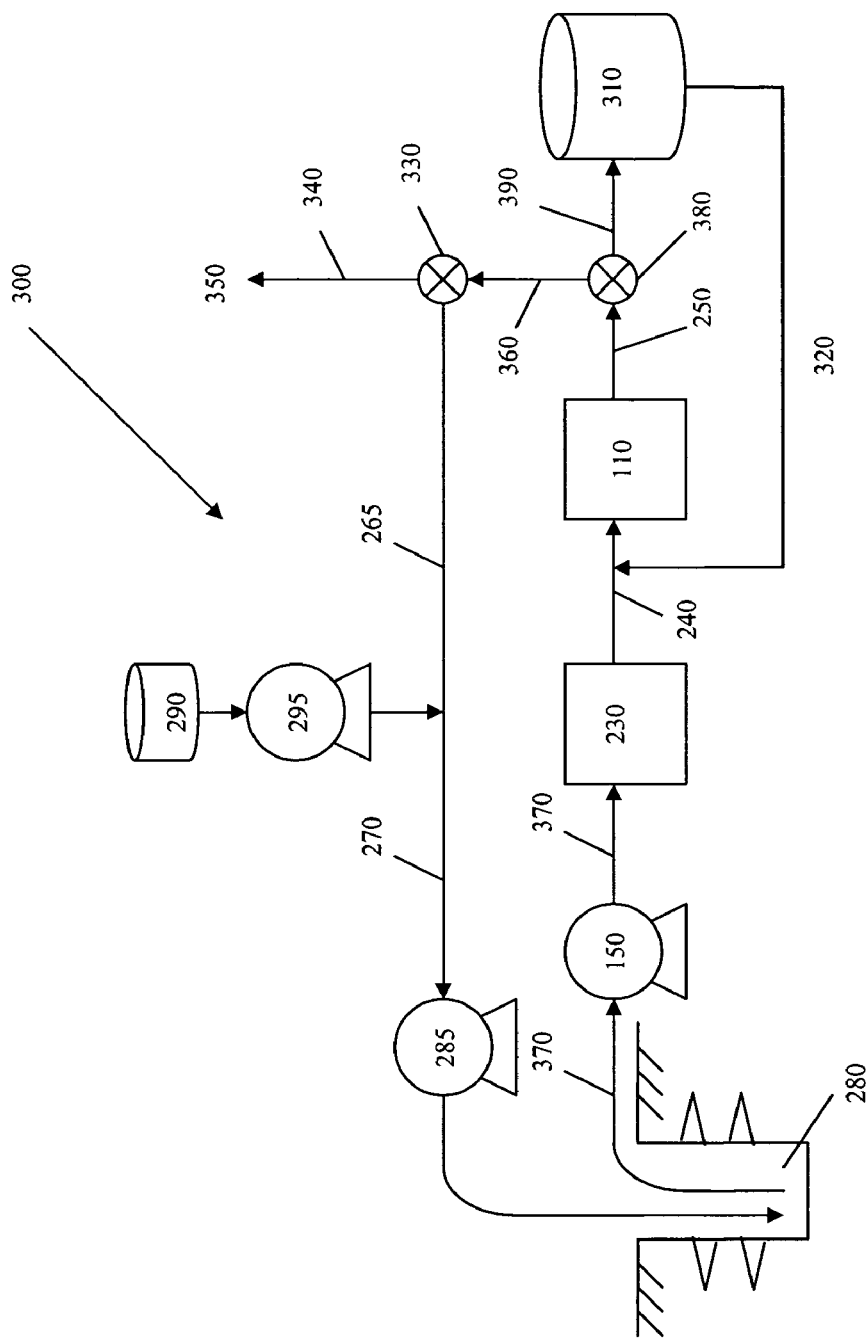
FIG. 3 is a flow schematic of a representative well servicing operation employing an irradiation system to remediate formation fluid or flowback fluid, either for re-use in another servicing operation or for disposal.

Because water is often scarce at remote well site locations, it may also be desirable to re-use the flowback water produced by the well fracturing or other servicing operation. FIG. 3 schematically depicts a representative remediation operation 300 utilizing the irradiation apparatus 110 to disinfect flowback fluid with the option to re-use the remediated fluid or dispose of it. The remediation operation 300 comprises a lift pump 150, filters 230, an irradiation apparatus 110, a first valve 380, a storage tank 310, a second valve 330, an injection pump 295, storage 290 for gel and other fracturing fluid components, and a service pump 285.

The filters 230 may be of the same type, or a different type, as those used in the pipeline operation 100 or the well servicing operation 200 shown in FIGS. 1 and 2, respectively. The storage tank 310 may be replaced by a lined pit or other fluid storage reservoir. Pumps 150, 285, and 295 may be of any type suitable for moving fluid and compatible with fluids in the remediation operation 300. Valves 330 and 380 may be any type of valve used to direct fluid flow and compatible with fluids in the remediation operation 300. Again, all or some of the components shown in FIG. 3 may be containerized with other flow regulation equipment and instrumentation and mounted on a skid, thereby making the entire apparatus portable. In an embodiment, the skid mounted equipment is electrically powered, and may be operated using generators in remote locations.

When a fracturing operation is conducted in the well bore 280, flowback fluid 370 is produced comprising a mixture of formation fluid and fracturing fluid. The flowback fluid 370 is lifted out of the well bore 280 and conveyed through the filters 230 by the lift pump 150. Filtered fluid in line 240 then passes through the irradiation apparatus 110, where it is disinfected. The filtered and irradiated fluid in line 250 is then diverted by valve 380 to the storage tank 310 via line 390 or towards a second valve 330 via line 360. Fluid stored in the tank 310 may later be circulated through re-treatment line 320 and through the irradiation apparatus 110. The fluid diverted into line 360 is directed towards valve 330, where the filtered and irradiated fluid may be diverted through line 340 for disposal to the environment 350 or through return line 265 for re-use in the fracturing operation. Alternatively, instead of re-using the filtered and irradiated fluid at the same well site, this fluid may be hauled by truck or transported by another means for re-use at a remote well site. If diverted through line 340 for disposal, the filtered and irradiated fluid will be tested to ensure that it is environmentally safe before it is released to the environment 350, which may be a water source, e.g. river or lake; a land surface; or injected into a disposal well. If diverted through return line 265 for re-use, gel and other frac fluid components from storage 290 may be added to the irradiated and filtered fluid in line 265 by the injection pump 295 to produce the frac fluid in line 270. The frac fluid is then injected by the service pump 285 to conduct the fracturing operation in the well bore 280.

Thus, where fluids treated with chemical biocides or untreated fluids previously may have been used in a hydrocarbon industry application, such as pipeline pre-commissioning or well fracturing, for example, an irradiated servicing fluid may be used instead. Irradiation may be performed using a portable system comprising an irradiation apparatus 110. These portable systems may also be used at sites where fluids must be disinfected, but the use of fluids treated with chemical biocides is prohibited, either due to environmental concerns or cost or both. Therefore, the irradiation apparatus may be sent to the location for any type of hydrocarbon industry application where it is desirable to disinfect fluid.

The foregoing descriptions of specific embodiments of hydrocarbon industry systems and applications utilizing an irradiation apparatus to disinfect fluids have been presented for purposes of illustration and description and are not intended to be exhaustive or to limit the invention to the precise forms disclosed. Obviously many other modifications and variations of these hydrocarbon industry systems and applications are possible. In particular, the position of the irradiation system 110 could be varied. For example, the irradiation could be performed prior to the fluid entering the filtering stage, or the fluid may not require filtering at all. Also, the ultraviolet light treatment could be performed more than once, if necessary, with the use of additional piping. The systems 100, 200, 300 could be arranged differently, and have more or less components.

Moreover, other hydrocarbon industry applications are possible. In particular, one of ordinary skill in the art will readily appreciate that the fluid treatment systems disclosed herein are equally suitable for disinfecting servicing fluids, or constituents thereof, for use in applications such as refining and processing vessels, reactors and pipelines; production platform vessels and pipelines; storage applications, including land-based storage tanks and tanks provided on floating production storage and offloading facilities; and pipeline transportation stations and facilities, as well as other applications. Such disinfected servicing fluids may be used for a wide variety of purposes, such as flushing out product and/or cleaning hydrocarbons from the walls of a vessel or pipeline, preserving a vessel or pipeline after cleaning, or filling a storage tank, for example.

While various embodiments of hydrocarbon industry applications utilizing irradiation to disinfect fluid, as a substitute for fluids treated with chemical biocides, or untreated fluids, have been shown and described herein, modifications may be made by one skilled in the art without departing from the spirit and the teachings of the invention. The embodiments described herein are representative only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of any reference in the Background section is not an admission that it is prior art to the present invention, especially any reference that may have a publication date after the priority date of this application. The disclosures of all patents, patent applications, and publications cited herein are hereby incorporated by reference, to the extent that they provide representative, procedural or other details supplementary to those set forth herein.

What we claim as our invention is:

1. A method comprising: performing a hydrocarbon industry service operation with an irradiated fluid that is biologically inert, wherein the fluid is freshwater and a pipeline that comprises an alloy material receives the fluid.

2. A method comprising: performing a hydrocarbon industry service operation with an irradiated fluid that is biologically inert, wherein the service operation comprises flooding a pipeline, hydrostatically testing the pipeline, or both, and wherein the pipeline is offshore.

3. The method of claim 2 wherein the fluid was irradiated with ultraviolet light.

4. The method of claim 2 wherein the service operation comprises injecting the irradiated fluid into a well.

5. The method of claim 2 wherein the service operation comprises fracturing a formation.

6. The method of claim 2 wherein the service operation comprises filling, cleaning, hydrostatically testing, flushing, preserving, or a combination thereof.

7. The method of claim 2 further comprising: disposing of the irradiated fluid to the environment when the service operation is complete.

8. The method of claim 2 further comprising: capturing the irradiated fluid when the service operation is complete.

9. The method of claim 8 further comprising:
re-irradiating the captured irradiated fluid to produce a remediated fluid; and
performing a service operation with the remediated fluid.

10. The method of claim 2 wherein the fluid is freshwater or saltwater.

11. The method of claim 2 wherein the fluid is a formation fluid or a flowback fluid.

12. The method of claim 2 wherein the fluid is substantially free of a biocide.

13. The method of claim 2 further comprising: filtering the fluid prior to irradiating the fluid.

14. The method of claim 2 further comprising: filtering the fluid after the fluid has been irradiated.

15. The method of claim 2 wherein the fluid is irradiated a plurality of times.

16. The method of claim 2 wherein the fluid is not biologically inert prior to irradiation.

17. The method of claim 2 wherein the fluid is seawater obtained from a body of saltwater within which the offshore pipeline is submerged.

18. The method of claim 2 further comprising: when the service operation is complete, disposing of the irradiated fluid to a body of saltwater within which the offshore pipeline is submerged.

19. The method of claim 2 wherein the service operation is a pipeline pre-commissioning operation.

20. The method of claim 2 wherein prior to at least one of the flooding the offshore pipeline and the hydrostatically testing the offshore pipeline, the offshore pipeline is laid on a seabed.

21. The method of claim 2 wherein the offshore pipeline is provided with a gel barrier associated with the irradiated fluid that prevents seawater from contacting an inner surface of the offshore pipeline.

22. The method of claim 2 wherein the offshore pipeline is submerged in seawater while hydrostatically testing the offshore pipeline.

23. A method comprising: performing a hydrocarbon industry service operation with an irradiated fluid that is biologically inert, wherein the service operation comprises flooding a pipeline, hydrostatically testing the pipeline, or both, and wherein the pipeline is onshore.

24. The method of claim 23 wherein the irradiated fluid is irradiated with ultraviolet light and filtered prior to performing the service operation and wherein the service operation is a pipeline pre-commissioning operation.

25. The method of claim 24 wherein the irradiated fluid is flooded into the pipeline to fill the pipeline, connections are made to the pipeline while the irradiated fluid is in the pipeline, the pipeline is hydrostatically tested after the connections are made to the pipeline, and the irradiated fluid is disposed to the environment after hydrostatically testing the pipeline.

26. A method comprising: performing a hydrocarbon industry service operation with an irradiated fluid that is biologically inert, wherein the service operation comprises flooding a pipeline, hydrostatically testing the pipeline, or both, and wherein the fluid does not corrode the pipeline.

27. The method of claim 26 wherein the irradiated fluid is irradiated with ultraviolet light and filtered prior to performing the service operation and wherein the service operation is a pipeline pre-commissioning operation.

28. The method of claim 27 wherein the irradiated fluid is flooded into the pipeline to fill the pipeline, the pipeline is hydrostatically tested while containing the irradiated fluid, and the irradiated fluid is disposed to the environment after hydrostatically testing the pipeline.

* * * * *